United States Patent
Korney, Jr.

(10) Patent No.: US 6,464,913 B1
(45) Date of Patent: *Oct. 15, 2002

(54) IN-LINE COMPOUNDING AND EXTRUSION SYSTEM

(75) Inventor: Arthur F. Korney, Jr., Pickerington, OH (US)

(73) Assignee: Crane Plastics Company Limited Partnership, Columbus, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,191

(22) Filed: Sep. 5, 1997

(51) Int. Cl.[7] .............................................. B29C 47/00
(52) U.S. Cl. .............. 264/102; 264/211.21; 264/211.23
(58) Field of Search ........................... 264/102, 211.12, 264/211.13, 211.23, 126, 176.1, 211.21

(56) References Cited

U.S. PATENT DOCUMENTS

| | | | |
|---|---|---|---|
| 1,156,096 A | * 10/1915 | Price | ..................... 264/211.23 |
| 4,292,359 A | 9/1981 | Mosso | |
| 4,632,795 A | 12/1986 | Huber et al. | |
| 4,902,455 A | * 2/1990 | Wobbe | ........................ 264/102 |
| 5,126,088 A | 6/1992 | Andres | |
| 5,437,826 A | * 8/1995 | Martinello et al. | ..... 264/211.23 |
| 5,474,722 A | * 12/1995 | Woodhams | .................. 264/126 |
| 5,518,677 A | * 5/1996 | Deaner et al. | ......... 264/211.23 |
| 5,589,203 A | * 12/1996 | Sato | ........................... 264/102 |

* cited by examiner

Primary Examiner—Mark Eashoo
(74) Attorney, Agent, or Firm—Standley & Gilcrest LLP

(57) ABSTRACT

The present invention is a continuous in-line compounding and extrusion system that does not require pre-dried wood flour or pelletized feed stock of cellulosic/polymer composite materials in order to produce net shapes from cellulosic/polymer composite materials. A preferred embodiment of the present invention utilizes automated loss-in-weight feeders to dispense wood flour and all of the other cellulosic/polymer composite materials into a compounder. The compounder blends the cellulosic/polymer composite materials into a composite melt. The composite melt is continuously devolitalized as it travels through the compounder, a transition chute, and a finish extruder. The composite melt is then forced through a profile die which is fitted to the finish extruder in order to achieve a net shape.

18 Claims, 2 Drawing Sheets

IN-LINE COMPOUNDING AND EXTRUSION SYSTEM

BACKGROUND AND SUMMARY OF THE INVENTION

The present invention relates generally to a continuous in-line compounding and extrusion system, and more particularly to, a continuous in-line compounding and extrusion system that produces net shapes. The present invention is useful for several different formulations and material composites including, but not limited to, poly-vinyl chloride (PVC) formulations, polyethylene (HDPE) formulations, and cellulosic/polymer composites. The present invention will be described primarily with reference to cellulosic/polymer composites, but it is also intended for use with other material composites and formulations.

Cellulosic/polymer composites are used as replacements for all-natural wood, particle board, wafer board, and other similar materials. In recent years, a tremendous demand has developed for cellulosic/polymer composites that exhibit the look and feel of natural woods. Unfortunately, the supply of natural woods for construction and other purposes is dwindling. Consequently, many are concerned about conserving the world's forests, and the cost of natural woods has risen.

The demand for cellulosic/polymer composites has also increased for other reasons. As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites may be sawed, sanded, shaped, turned, fastened, and finished in the same manner as natural woods. Therefore, cellulosic/polymer composites are commonly used for applications such as interior and exterior decorative house moldings, picture frames, furniture, porch decks, window moldings, window components, door components, and roofing structures.

Traditionally, two types of processes have been employed to manufacture cellulosic/polymer composites. The first type of process manufactures the cellulosic/polymer composite materials into pelletized feed stock that is later, at another site, fed into a single or twin-screw extruder. The output of the extruder is then sent through a profile die to obtain a net shape. However, this type of manufacturing process has drawbacks because it requires an independent mixing and storage system to compound, pelletize, cool, package, and store feed stock of the cellulosic/polymer composite materials.

The second type of manufacturing process eliminates the need to pelletize, cool, package, and store feed stock of the cellulosic/polymer composite materials. Instead, the second type of manufacturing process blends the polymer materials into a homogeneous mixture. The homogeneous mixture is delivered to a site where it is then combined with pre-dried wood flour. The resulting composition is fed through a twin-screw extruder which converts the composition into a fused melt. The fused melt is then pumped through a profile die to achieve a net shape.

Conventional use of a twin-screw extruder, however, is not an efficient means to maintain a relatively dry mixture. Moreover, when employing the second type of manufacturing process, precise guidelines must be adhered to in order to achieve the superior qualities of cellulosic/polymer composites. Most importantly, the wood flour that constitutes the cellulosic material must be dried before it is extruded. As is well known in the art, failure to dry the wood flour before it is extruded will commonly result in a fragile composite that is susceptible to cracking, blistering, and deteriorating appearance.

Once the wood flour is dried to the appropriate moisture content level for the second type of manufacturing process, care must also be taken to prevent the wood flour from reabsorbing additional moisture before it is extruded. Early attempts at manufacturing cellulosic/polymer composites failed because the wood flour was stored in humid manufacturing environments before it was extruded. Compounding systems for the second type of manufacturing process have since been employed to prevent the wood flour from absorbing undesired moisture. One such system utilizes a large dryer to pre-dry the wood flour and to maintain a dry storage environment for the wood flour.

Cost is an inherent drawback to using a large dryer to pre-dry the wood flour or to maintain a dry storage environment for the wood flour. For example, a drying/blending system for a large scale production facility can cost several million dollars. In addition, this type of compounding system requires bulky storage containers to hold the cellulosic/polymer composite materials, an elaborate piping and control system to transfer the cellulosic/polymer composite materials to various holding stations, and an independent mixing mechanism to combine the cellulosic/polymer composite materials. Consequently, such a compounding system is costly, susceptible to wear and tear, and time-consuming.

On the other hand, a compounding system which utilizes pre-dried wood flour that has been purchased from a remote commercial compounder also has shortcomings. The extra cost of dealing with a remote commercial compounder is not desirable, and the wood flour may have to be redried once it arrives at the extrusion facility prior to passing it through the extruder. This approach also has inherent drawbacks such as ordering, shipping, and material handling problems. Therefore, regardless of the compounding system which is employed, the second type of manufacturing process also possesses undesirable characteristics.

In light of the deficiencies of known manufacturing processes, a need exists for a manufacturing system that does not require an independent mixing mechanism to pelletize, cool, package, or store feed stock of the cellulosic/polymer composite materials. In addition, a need exists for a manufacturing system that utilizes a compounder instead of a twin-screw extruder to blend the cellulosic/polymer composite materials into a composite melt, and a need exists for a manufacturing system that does not require a costly, large dryer to pre-dry the wood flour or to maintain a dry storage environment for the wood flour. The present invention is designed to address these needs. The present invention is also designed to produce net shapes at higher rates, to streamline the manufacturing process, to create a manufacturing system that is less susceptible to wear and tear, to reduce the production costs of wood flour, to eliminate the drawbacks of independent drying, blending, and pelletizing systems, and to eliminate the problems caused by the shipping and material handling of wood flour.

In particular, the present invention continuously produces net shapes via an automated and continuous compounding plus finish extrusion system that does not require pre-dried wood flour or pelletized feed stock of the cellulosic/polymer composite materials. A preferred embodiment of the present invention utilizes automated loss-in-weight feeders to dispense wood flour and all of the other cellulosic/polymer composite materials into a compounder. The compounder blends the cellulosic/polymer composite materials into a composite melt. The composite melt is continuously devolitalized as it travels through the compounder, a transition chute, and a finish extruder. The composite melt is then forced through a profile die which is fitted to the finish extruder in order to achieve a net shape. The present invention, however, is not limited to the production of cellulosic/polymer composite shapes. The present invention may also be utilized to produce net shapes from material composites or formulations that do not include cellulosic materials. For instance, the present invention may produce net shapes from polyethylene (HDPE), poly-vinyl chloride (PVC), and formulations that incorporate these materials. Moreover, the present invention may be used in conjunction with any material that may be adapted to be formed into a net extruded shape.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
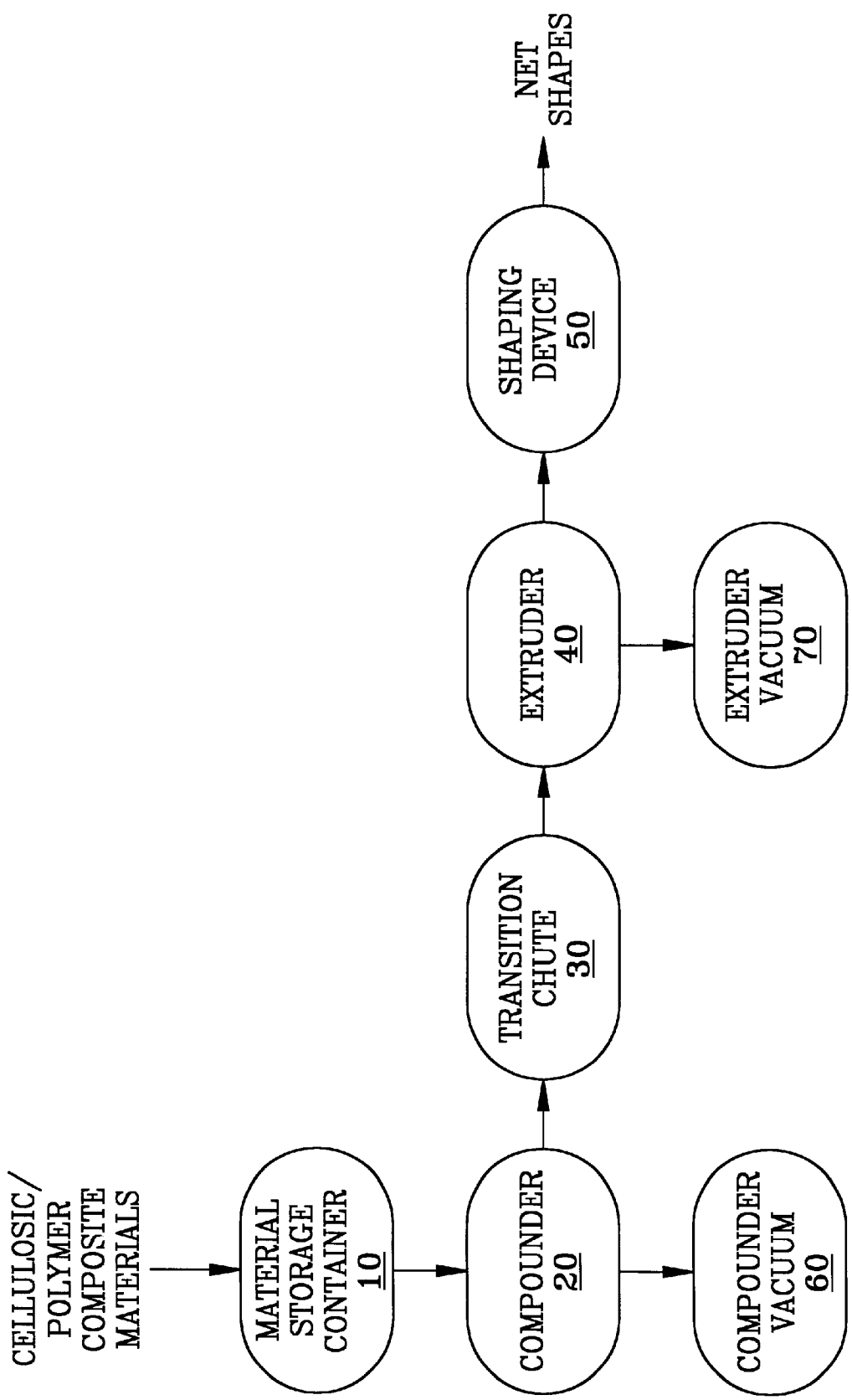
FIG. 1 is a block diagram illustrating the process of the present invention.

The present invention is directed to a continuous, in-line, compounding plus finish extrusion system that produces net shapes from materials that may be adapted to be formed into net shapes such as poly-vinyl chloride (PVC) formulations, polyethylene (HDPE) formulations, and/or cellulosic/polymer composite materials. In performing this function, the unique compounding and extrusion system of the present invention eliminates the need to pre-dry the cellulosic material prior to feeding it to the compounder. In addition, it does not require an independent mixing mechanism to compound, pelletize, cool, package, or store feed stock of the cellulosic/polymer composite materials. By achieving these objectives, the in-line compounding and extrusion system of the present invention effectively overcomes the obstacles presented by the moisture sensitivity of cellulosic materials. Moreover, the present invention produces net shapes at a vastly higher rate than known systems. In fact, the present invention may produce net shapes at a rate exceeding 3,000 pounds per hour.

Due to the capabilities of the present invention, the composite may have a higher cellulosic content than previously used in the art. Moreover, the process of the present invention is not limited to the mixing of pure cellulosic/polymer composite materials. The present invention may produce net shapes from any material that may be adapted to be formed into a net shape, wherein such material may be comprised of one or more materials that may be adapted to be formed into a net shape. Accordingly, the cellulosic/polymer composite materials may include one or more raw materials including, but not limited to, cellulosic materials, thermoplastic materials, inorganic fillers, cross-linking agents, process lubricants, accelerators, inhibitors, enhancers, compatibilizers, blowing agents, and other similar materials.

The cellulosic materials utilized in one preferred embodiment of the present invention may include any combination of sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, or any other similar materials. The thermoplastic materials may include multilayer films, polyethylene (HDPE), polypropylene, poly-vinyl chloride (PVC), low density polyethylene (LDPE), CPVC ABS, ethyl-vinyl acetate, other similar polyethylene copolymers, other similar thermoplastic materials, or formulations that incorporate any of the aforementioned thermoplastic materials. Examples of inorganic fillers include talc, calcium carbonate, kaolin clay, magnesium oxide, titanium dioxide, silica, mica, barium sulfate, or any other similar materials. Commonly used cross-linking agents include polyurethanes, such as isocyanates, phenolic resins, unsaturated polyesters, and epoxy resins. Combinations of the aforementioned materials are also known examples of cross-linking agents. In addition, lubricants such as zinc stearate and wax are commonly used to aid the process.

Shown below is an example of a combination of cellulosic/polymer composite materials that may be extruded with the system of the present invention:

Wood Flour+Polyethylene(HDPE)+Wax

FIG. 1 illustrates the process of the in-line compounding and extrusion system. The process does not require pre-dried wood flour or pelletized feed stock of cellulosic/polymer composite materials. Instead, the cellulosic/polymer composite materials are stored as raw materials in at least one material storage container 10. Ideally, each cellulosic/polymer composite material is stored in a separate material storage container 10. It is well known in the art that loss-in-weight feeders may be utilized to store and provide the cellulosic/polymer composite materials.

Each material storage container 10 has at least one feeder to dispense its contents. After sufficient quantities of the cellulosic/polymer composite materials are loaded into at least one material storage container 10, a desired ratio of cellulosic/polymer composite materials is dispensed by the feeder or feeders, and a first aperture of a compounder 20 receives the desired ratio of cellulosic/polymer composite materials. Although this function may be manually performed, it is well known in the art that loss-in-weight feeders may be automated to continuously dispense the desired ratio of cellulosic/polymer composite materials to the compounder 20.

Figure 2:
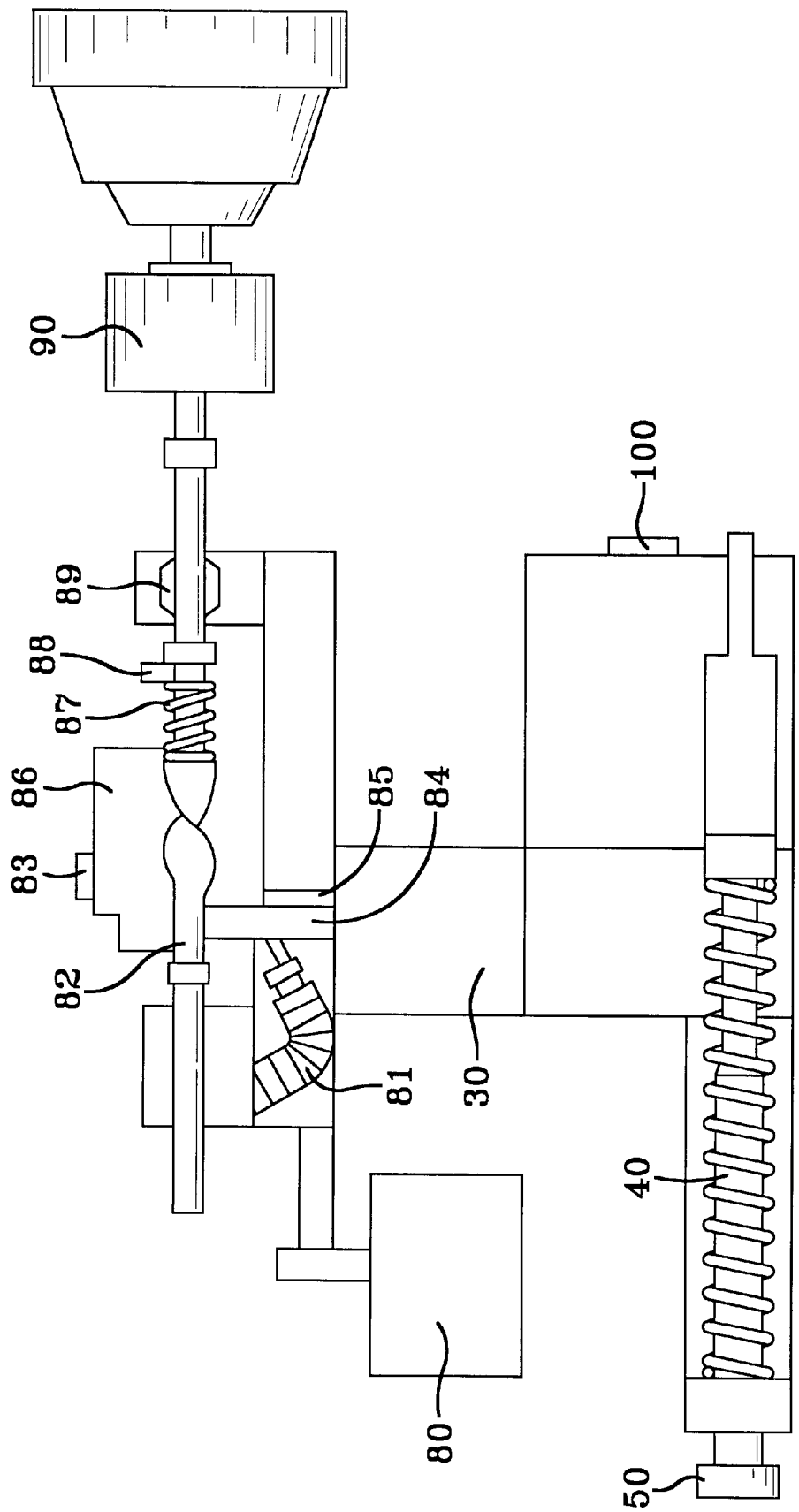
FIG. 2 is a diagram of a compounder plus finish extruder of a preferred embodiment of the present invention.

The compounder 20 is utilized to blend the cellulosic/polymer composite materials into a composite melt. A CP Compact Compounder (CP1000) by the Farrel Corporation may be used for this purpose. FIG. 2 includes a diagram of a compounder 20. As shown in FIG. 2, a compounder 20 may include a touch view control screen 80, an electric motor actuator 81, visco seals 82, a vent 83, a melt temp thermocouple 84, a teflon-impregnated, electrically heated orifice 85, an electrically heated, segmented chamber barrel 86, a rotor with three-piece quick disconnect couplings 87, packing glands 88, grease packed bearings 89, and a unidrive gear reducer 90.

The compounder 20 continuously devolitalizes the composite melt. As the compounder 20 devolitalizes the composite melt, the composite melt travels through a second aperture of the compounder 20. A transition chute 30 is coupled to the compounder 20 for transferring the composite melt to a finish extruder 40. The transition chute 30 has a first end which receives the composite melt from the second aperture of the compounder 20. The composite melt continues to devolitalize as it travels through the transition chute 30. The composite melt then travels through a second end of the transition chute 30.

The compounder 20 and the transition chute 30 may be independent units which are coupled together. However, a CP Compact Compounder (CP1000) by the Farrel Corporation is equipped with a compounder 20 and a transition chute 30 which may perform the aforementioned functions. Regardless of the method of manufacture, the finish extruder 40 may be coupled to the transition chute 30 so that the finish extruder 40 receives the composite melt from the second end of the transition chute 30.

The composite melt continues to devolitalize as it travels through and is extruded by the finish extruder 40. The finish extruder 40 may be a single-screw extruder or a twin-screw extruder. For example, a preferred embodiment of the present invention may use a twin-screw extruder (CM-80-Hp) by Cincinnati Milacron. At least one shaping device 50 is fitted to the finish extruder 40. Each shaping device 50 has at least one orifice through which the composite melt is forced in order to form the composite melt into a net shape. Profile dies and composite molders are examples of shaping devices 50 that are commonly used to perform this function. It is further known in the art that a plurality of such shaping devices 50 may be fitted to the finish extruder 40 in order to achieve a desired net shape.

In addition to the process described above, additional measures may be taken to achieve greater devolitalization of the composite melt. For instance, each feeder that dispenses cellulosic materials into the compounder 20 may be heated in order to dry the cellulosic materials as the cellulosic materials are dispensed into the compounder 20. In addition, the composite melt may be subjected to one or more vacuums while it travels through the compounder 20. In order to achieve this function, a compounder vacuum 60 is connected to a vent 83 of compounder 20. Similarly, the composite melt may be subjected to one or more vacuums while it is pumped through the finish extruder 40. This feature may be achieved, for example, by connecting an extruder vacuum 70 to a vent port 100 of finish extruder 40.

None of the measures described above to achieve greater devolitalization of the composite melt is exclusive of the others. If a cellulosic/polymer composite has a low cellulosic content, additional measures may not be required to devolitalize the composite melt. However, if the cellulosic/polymer composite has a high cellulosic content, several, if not all, of the additional measures may be employed in order to achieve adequate devolitalization of the composite melt.

The preferred embodiments herein disclosed are not intended to be exhaustive or to unnecessarily limit the scope of the invention. The preferred embodiments were chosen and described in order to explain the principles of the present invention so that others skilled in he art may practice the invention. Having shown and described preferred embodiments of he present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A process for producing final net shapes from cellulosic/polymer composite materials, said process comprising:

dispensing a desired ratio of said cellulosic/polymer composite materials into a first extrusion device independently of a pre-drying step in advance of said dispensing, said cellulosic/polymer composite materials including a cellulosic material having a moisture content;

utilizing said first extrusion device to blend the cellulosic/polymer composite materials into a composite melt;

devolitalizing the composite melt while the composite melt travels through the first extrusion device such that said moisture content of said cellulosic material is reduced;

transferring the composite melt directly with uninterrupted material flow to a second extruder having at least one extruder screw, wherein the at least one extrude screw is independent from the first extrusion device, and the second extruder is connected to the first extrusion device by a material transfer passage; and forcing the composite melt through at least one shaping device in association with the second extruder in order to form a final net shape substantially free of damage that can be caused by an excessive moisture content of said cellulosic/polymer composite materials.

2. The process of claim 1 further comprising the step of drying the cellulosic materials as the cellulosic materials are dispensed into the first extrusion device.

3. The process of claim 2 further comprising the step of subjecting the composite melt to a vacuum while it travels through the first extrusion device.

4. The process of claim 2 further comprising the step of subjecting the composite melt to a vacuum while it travels through the second extruder.

5. The process of claim 2 further comprising the steps of:
subjecting the composite melt to a vacuum while it travels through the first extrusion device; and
subjecting the composite melt to a vacuum while it travels through the second extruder.

6. The process of claim 1 further comprising the step of subjecting the composite melt to a vacuum while it travels through the first extrusion device.

7. The process of claim 6 further comprising the step of subjecting the composite melt to a vacuum while it travels through the second extruder.

8. The process of claim 1 further comprising the step of subjecting the composite melt to a vacuum while it travels through the second extruder.

9. The process of claim 1 wherein a desired ratio of cellulosic/polymer composite materials is continuously dispensed into the first extrusion device.

10. The process of claim 1, wherein said first extrusion device is a compounder.

11. The process of claim 1, wherein said first extrusion device is a twin screw extruder.

12. The process of claim 1, wherein said second extruder is a twin screw extruder.

13. A process for producing final net shapes from a material including at least on cellulosic ingredient that may be adapted to be formed into a net shape, said process comprising:

providing said material including said at least on cellulosic ingredient that may be adapted to be formed into a net shape, said at least one cellulosic inggredient having a moisture content;

dispensing the material into a first extrusion device independently of a pre-drying step of said least one cellulosic ingredient in advance of said dispensing;

utilizing the first extrusion device to blend the material into a composite melt such that said moisture content of said at least one cellulosic ingredient is reduced;

transferring the composite melt through a transition chute to a second extruder having at least one extruder screw, wherein the at least on extruder screw is independent from the first extrusion device; and forcing the composite melt through at least one shaping device in association with the second extruder in order to form a final net shape substantially free of damage that can be caused by an excessive moisture content of said at least one cellulosic ingredient.

14. The process of claim 13 wherein the material is a formulation that incorporates polyethylene.

15. The process of claim 13 wherein the material is a formulation that incorporates polyvinyl chloride.

16. The process of claim 13, wherein said first extrusion device is a compounder.

17. The process of claim 13, wherein said first extrusion device is a twin screw extruder.

18. The process of claim 13, wherein said second extruder is a twin screw extruder.

* * * * *

UNITED STATES PATENT AND TRADEMARK OFFICE
CERTIFICATE OF CORRECTION

PATENT NO.    : 6,464,913 B1
DATED         : October 15, 2002
INVENTOR(S)   : Korney Jr.

It is certified that error appears in the above-identified patent and that said Letters Patent is hereby corrected as shown below:

Column 3,
Line 6, please begin a new paragraph at the words "The present".

Column 6,
Lines 55 and 58, please delete "on" and insert -- one --.
Line 60, please delete "inggredient" and insert -- ingredient --.

Column 7,
Line 3, please delete "on" and insert -- one --.

Signed and Sealed this

Nineteenth Day of August, 2003

JAMES E. ROGAN
*Director of the United States Patent and Trademark Office*